H. J. REEDY.
HOISTING MACHINE.
No. 4,273. Reissued Feb. 21, 1871.
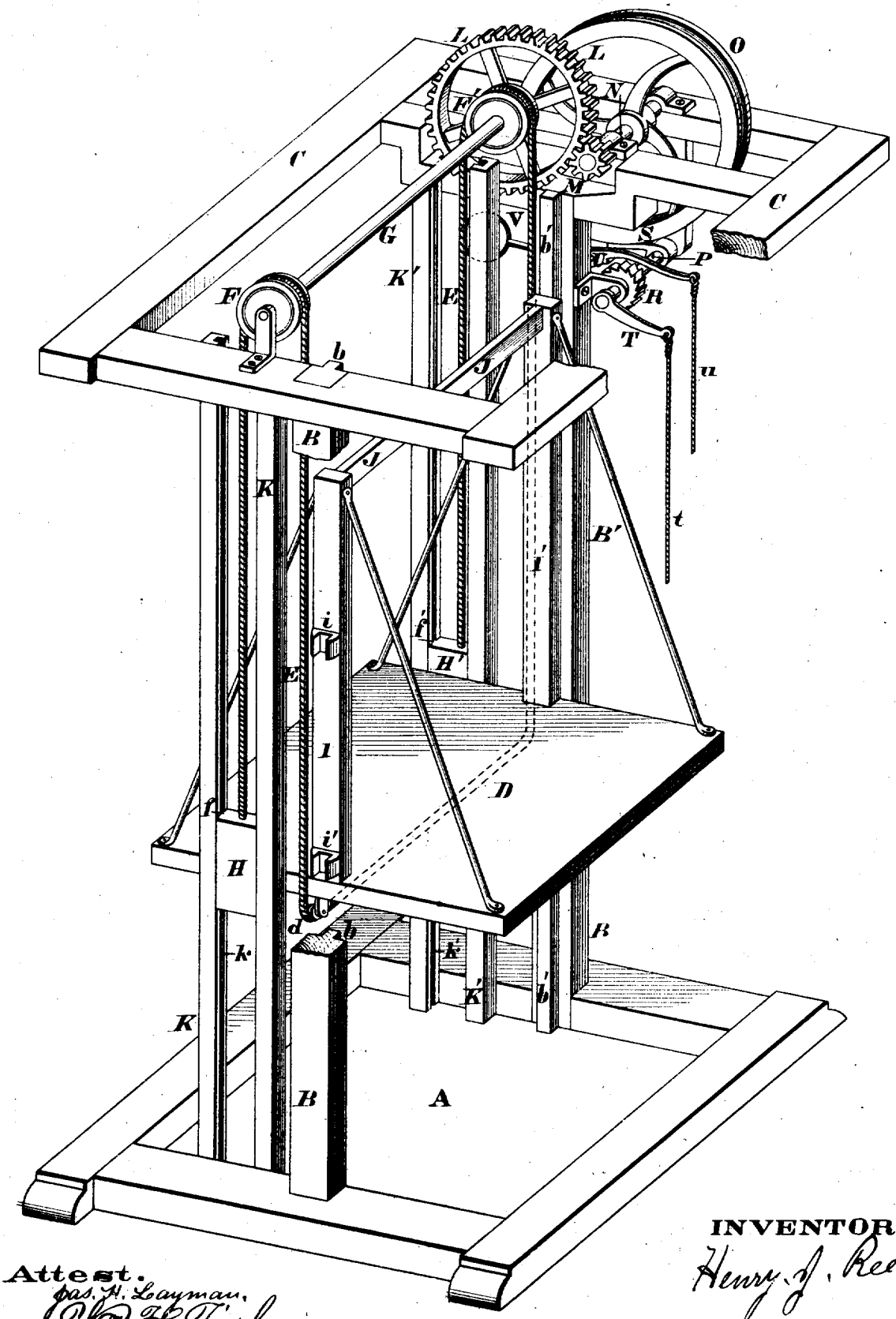
Attest.
Jas. H. Layman.
Wm. H. Fisher.
INVENTOR.
Henry J. Reedy
THE NORRIS PETERS CO., PHOTO-LITHO., WASHINGTON, D. C.

United States Patent Office.

HENRY J. REEDY, OF CINCINNATI, OHIO.

Letters Patent No. 78,829, dated June 9, 1868; reissue No. 4,273, dated February 21, 1871.

IMPROVEMENT IN HOISTING-MACHINES.

The Schedule referred to in these Letters Patent and making part of the same.

Be it known that I, HENRY J. REEDY, of Cincinnati, in the county of Hamilton and State of Ohio, have invented certain new and useful Improvements in Hoisting-Machines, of which the following is a specification.

My invention consists in supporting the platform of a hoisting-machine upon the mid-length of a single rope, whose two ends, after passing upward and over two sheaves, are attached to suitable weights, which not only counterbalance the platform but also compel the rope to hug said sheaves very closely, so that when the latter are rotated in either direction the platform will be elevated or depressed, thereby dispensing with the ordinary drum upon which the hoisting-rope is usually wound.

The accompanying drawing, making a part of this specification, is a perspective view of a hoisting-machine embodying my improvements, a portion of the frame-work being taken away so as to exhibit more clearly the details of construction.

A represents a hatchway, and

B B′ are stanchions, placed at two opposite sides of the same; and these stanchions support at their upper ends a staging, C, which supports the different hoisting devices, which will be hereafter described.

D represents the platform, which is supported upon a stout rope, E, at or near the mid-length of the latter.

The two ends of this rope, after being passed upward and over the sheaves F F′ on the shaft G, are attached to weights, H H′, which serve to counterbalance the platform.

In order to prevent the hoisting-rope E being frayed out by chafing against the bottom edges of the platform, I attach thereto small rollers, *d*, upon which the rope constantly presses, and upon which it may play.

To the sides of the platform are attached stiles, I I′, whose upper ends are united to the beam J; and said stiles are provided with lugs, *i i′*, which traverse the ridges *b b′* of the stanchions, and thereby confine the platform to a vertical path.

The counterbalances are guided by the tongues *f f′*, which play within the grooves *k k′* of the vertical posts K K′.

The shaft G, to which the winding-drum is usually secured, has attached to one end of it a spur-wheel, L, which gears with a pinion, M, on the shaft N.

Said shaft, N, carries the main sheave-wheel O, around which passes the customary endless rope by which the hoisting devices are operated.

In order to arrest the ascent or descent of the platform at any part of the building, and to maintain it securely in position, I provide a brake, which is operated in the following manner, viz:

Under the shaft N and parallel therewith, is another shaft, P, which has keyed upon it a ratchet-wheel, R, spring-rubber, S, and lever, T, the latter having attached to its free end a cord, *t*, by which it is operated.

U is a pawl, adapted to engage with the teeth of ratchet-wheel R, and pivoted to the stanchion B′.

One end of said pawl is furnished with a counterweight, N, while to its other end is secured a rope, *u*.

Whenever it is desired to arrest the progress of the platform the cord *t* is pulled by the operator, so as to cause the spring-rubber S to press against the periphery of the main sheave O, which instantly checks the rotation of the latter and its accompanying elevating devices; and by drawing down on the rope *u* the pawl U is engaged with the teeth of the ratchet-wheel R so as to lock it.

When the brake is in this condition the platform can be safely maintained at any position for any length of time.

By exerting a slight degree of force upon the rope *t* the spring-rubber S will yield a sufficient distance to permit of the counterbalance V raising the pawl U, so as to disengage the latter from the teeth of the ratchet-wheel R, which disengagement unlocks the brake and leaves the platform at liberty to be raised or lowered.

It will be seen that the rope which carries the platform also supports the counterbalances, thereby dispensing with a number of additional ropes and pulleys, and the extra amount of friction arising from the use of the same.

It will also be seen that my hoisting-machine has no drum for the rope to wind upon, and, therefore, there is no danger of the coils of rope crowding and riding upon one another.

As the hoisting-rope is carried around the rollers on the under side of the platform, it is obvious that if there should be any greater strain upon any one end of the rope it is immediately compensated for, and there is, consequently, an equal stress on both sides of the platform. But, if preferred, each side of the platform may be suspended from different ropes.

For small hoisting-machines, dumb-waiters, &c., a single counterbalance, sheave, and rope may be employed, the latter being attached to the mid-length of the beam J.

Hoisting-machines which I have constructed and which are now in daily use have frequently elevated one and one-half ton, and without any slipping whatever, although the counter-weights H H′ only weigh one hundred and fifty pounds each, and the sheaves F F′ are not more than fourteen inches in diameter.

*Claims.*

What I claim as my invention, and desire to secure by Letters Patent, is—

1. In combination with the platform of a hoisting-machine and a cord or cords for elevating or depressing the same, two sheaves attached to and operated by the same horizontal shaft, for the purposes specified herein.

2. The combination, substantially as described, with a hoisting-platform, of the suspending-rope E, weights H H′, rollers *d*, sheaves F F′, and shaft G, or their mechanical equivalents, by which the platform is both balanced and enabled to be elevated and depressed in the manner explained.

3. The arrangement, substantially as described, of the shaft P, ratchet-wheel R, rubber S, lever T, and pawl U V, or their mechanical equivalents, for the purpose set forth.

In testimony of which invention I have hereunto set my hand.

HENRY J. REEDY.

Witnesses:
WM. H. FISHER,
I. J. MILLER.